W. J. TOLLERTON.
LUBRICATING MECHANISM.
APPLICATION FILED AUG. 13, 1917.
1,282,321.
Patented Oct. 22, 1918.
2 SHEETS—SHEET 1.
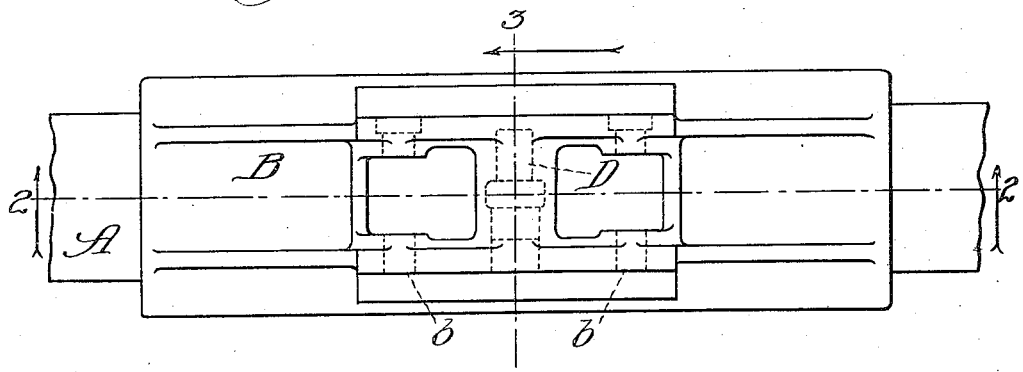
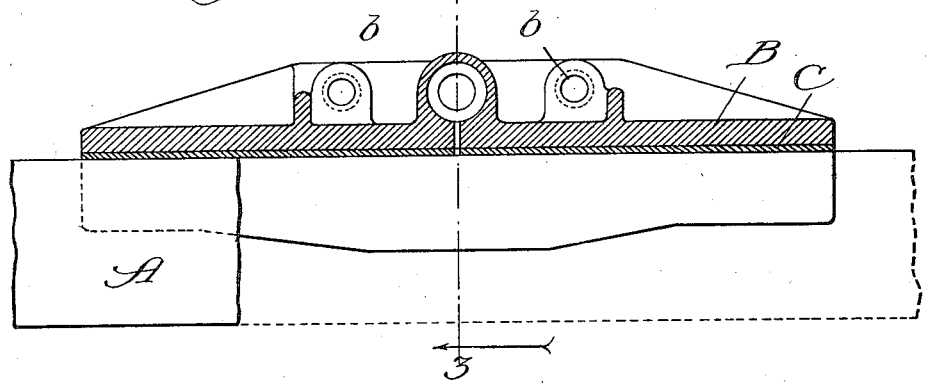
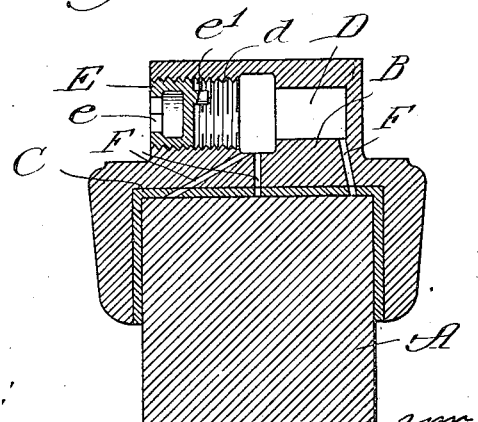

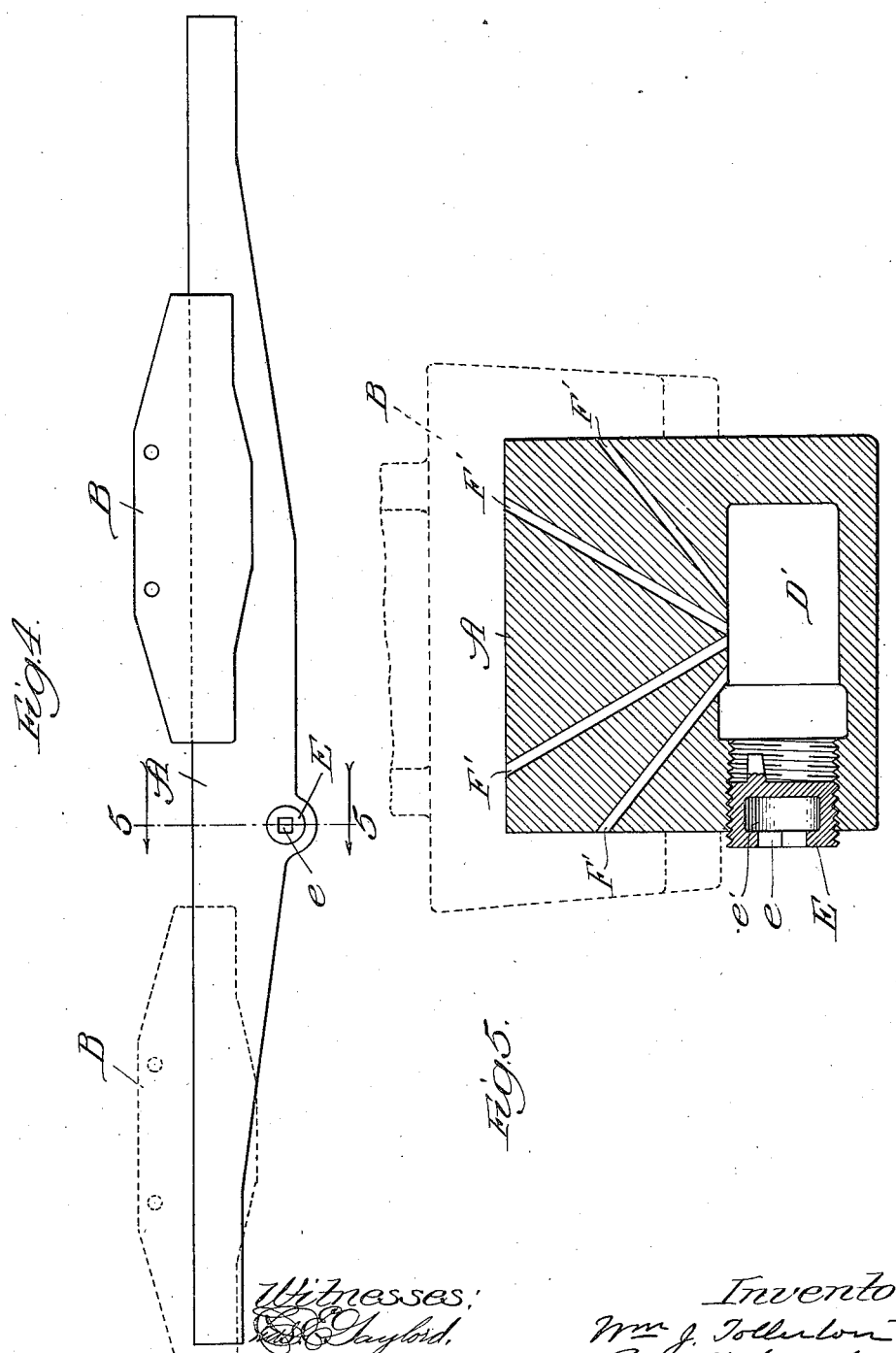

UNITED STATES PATENT OFFICE.

WILLIAM JAMES TOLLERTON, OF CHICAGO, ILLINOIS.

LUBRICATING MECHANISM.

1,282,321.   Specification of Letters Patent.   Patented Oct. 22, 1918.

Application filed August 13, 1917. Serial No. 185,838.

*To all whom it may concern:*

Be it known that I, WILLIAM J. TOLLERTON, a citizen of the United States, residing in Chicago, county of Cook, and State of Illinois, have invented certain new and useful Improvements in Lubricating Mechanism, of which I do declare the following to be a full, clear, and exact description, reference being had to the accompanying drawings, forming part of this specification.

The present invention while susceptible of more extended use is more particularly designed to provide improved means for lubricating the cross head gibs or shoes and guides of a locomotive and the invention consists in the features of novelty hereinafter described, illustrated in the accompanying drawings and more particularly pointed out in the claims at the end of this specification.

The lubrication of the cross head gibs or shoes and the guides of the locomotive has heretofore been effected by oil in fluid form but this is found objectionable because, unless the oil cups are promptly shut off at the end of each trip or run of the locomotive, they continue to feed until the oil is exhausted, thus occasioning needless waste. The object of my invention is to provide means whereby hard grease can be applied to lubricate the cross head gibs or shoes and guides in such manner as to avoid waste, while at the same time insuring an effective lubrication of the parts when in operation.

Figure 1 is a plan view of one of the gibs of a locomotive cross head and a portion of the slide whereon the gib is mounted to travel. Fig. 2 is a view in longitudinal section on line 2—2 of Fig. 1. Fig. 3 is an enlarged view in cross section on line 3—3 of Fig. 1. Fig. 4 is a view in side elevation of a guide showing the cross head gib mounted thereon, the grease chamber being formed in the guide itself. Fig. 5 is an enlarged view in cross section on line 5—5 of Fig. 4.

Referring to the form of the invention embodied in Figs. 1 to 3 of the drawings A designates one of the guides of the locomotive and B denotes one of the cross head gibs, this gib B being ordinarily formed of a single piece of metal and being provided with suitable means, as for example, the upstanding flanges $b$ having bolt holes therein whereby the gib can be conveniently connected to the cross head. The gib B is shown as provided with a liner C which however, forms no part of my present invention.

In the body of the cross head gib B and preferably about the center thereof, is formed a grease chamber D which is shown as extending transversely of the gib and as provided with interior screw threads $d$ extending inwardly from one end of the chamber. Into the threaded end of the grease chamber D is fitted a correspondingly threaded plug E having a polygonal opening $e$ adapted to receive a key whereby the plug E may be turned from time to time to effect the feeding of the grease from the chamber D. The inner end of the plug E is preferably provided with a lug or extension $e'$ that will embed itself in the hard grease and will aid in preventing any accidental working loose of the plug E.

From the foregoing description it will be seen that when the grease chamber D is filled with hard grease and the plug E is inserted in the threaded end of the chamber, the turning inward of the plug will force the grease from the chamber D through the channels or ducts F to the wearing face of the gib B and of the slide A.

Instead of forming the grease chamber in the cross head gib or shoe B this grease chamber may be formed in the body of the slide itself, as shown in Figs. 4 and 5 of the drawings. In this form of the invention the guide A is provided with an integral grease chamber consisting of a cavity D' having its outer end interiorly threaded as at $d$ and fitted with a screw threaded plug E as in the form of the invention shown in Figs. 1, 2 and 3 of the drawing. When the grease chamber is thus formed in the slide A a plurality of channels or ducts F' will lead from the grease chamber to the wearing face or faces of the slide.

The precise details of construction above set forth may be modified without departure from the scope of the invention.

Having thus described my invention, what I claim as new and desire to secure by Letters Patent, is:—

1. The combination of a cross head gib and the guide whereon it is mounted, one of said parts having an offset integral grease chamber extending transversely thereof, said chamber being interiorly screw-threaded and being provided with one or more channels leading from said chamber to the surface to be lubricated, and with a screw-threaded plug engaging the interiorly threaded portion of said chamber.

2. The combination with a guide, of a cross head gib mounted thereon and formed with a transverse integral offset portion chambered and screw-threaded to form a grease receptacle, and a plug engaging the threaded portion of said receptacle, suitable channels leading from said receptacle to the wearing face of the gib.

WILLIAM JAMES TOLLERTON.